US009430903B2

(12) United States Patent
Harvey et al.

(10) Patent No.: US 9,430,903 B2
(45) Date of Patent: Aug. 30, 2016

(54) PROGRESSIVE POOL MANAGEMENT

(71) Applicant: Bally Gaming, Inc., Las Vegas, NV (US)

(72) Inventors: Nathan Harvey, Pahrump, NV (US); Pravinkumar Patel, Las Vegas, NV (US); Patrick Spiller, Las Vegas, NV (US); Joshua D. Larsen, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 266 days.

(21) Appl. No.: 14/011,599

(22) Filed: Aug. 27, 2013

(65) Prior Publication Data

US 2015/0065232 A1 Mar. 5, 2015

(51) Int. Cl.
*G06F 17/00* (2006.01)
*G07F 17/32* (2006.01)

(52) U.S. Cl.
CPC .................................. *G07F 17/3258* (2013.01)

(58) Field of Classification Search
CPC .................................................... G07F 17/3258
See application file for complete search history.

(56) References Cited

U.S. PATENT DOCUMENTS

| | | | | |
|---|---|---|---|---|
| 7,419,430 | B1 * | 9/2008 | Joshi et al. | 463/27 |
| 2004/0048644 | A1 * | 3/2004 | Gerrard et al. | 463/16 |
| 2006/0183536 | A1 * | 8/2006 | Gagner et al. | 463/26 |
| 2007/0060321 | A1 * | 3/2007 | Vasquez et al. | 463/27 |
| 2010/0234098 | A1 * | 9/2010 | Hawkins | G07F 17/32 463/27 |
| 2011/0218908 | A1 * | 9/2011 | Johnson | G06Q 20/10 705/39 |
| 2012/0115616 | A1 * | 5/2012 | Phillips et al. | 463/42 |
| 2013/0331172 | A1 * | 12/2013 | Olsen | 463/20 |
| 2014/0256408 | A1 * | 9/2014 | Meyer | 463/25 |

* cited by examiner

*Primary Examiner* — Pierre E Elisca
*Assistant Examiner* — Carl V Larsen
(74) *Attorney, Agent, or Firm* — Seed IP Law Group PLLC

(57) ABSTRACT

Various embodiments are directed to systems and methods for providing management of multiple progressive pools. In some embodiments, a progressive pool management system may include at least one gaming machine configured to present a first game having a progressive pool. The progressive pool management system may include at least one gaming machine configured to present a second game having a progressive pool. The progressive pool management system may include a server in communication with the at least one gaming machine configured to present the first game and the at least one gaming machine configured to present the second game. The server may associate a section of a unified pool with the progressive pool of the first game. The server may associate a section of the unified pool with the progressive pool of the second game.

29 Claims, 2 Drawing Sheets

PROGRESSIVE POOL MANAGEMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This description generally relates to systems and methods for providing management of contributions between pools in a progressive system.

BACKGROUND

Many jurisdictions have restrictions on moving contributions between pools in a progressive system so as to avoid commingling of funds between different progressive pools. These rules ensure that all progressives which players have contributed to will eventually be paid back to players and that the accounting of the pools has a continuous chain of control.

However, there are business requirements and other reasons why it might be desirable to move contributions between pools. For example, taking a machine off the floor may remove an internal progressive pool used by the machine. In this regard, taking a machine off the floor may necessitate the transfer of the internal progressive pool funds used by the machine elsewhere so the funds may eventually be paid back to players. As another example, a particular progressive game title may be poor-performing, which may result in a casino repurposing an entire bank of machines presenting the poor-performing progressive game title to a new game title that may or may not be a progressive game title. Even if the new game title is also progressive, the new game title will not usually have the same cost-to-jackpot ("CTJ") and progressive related pool requirements as the game title being replaced.

It is unknown when a jackpot or other event will trigger, thereby depleting a progressive pool to zero contributions. Therefore, techniques that involve leaving a poor-performing progressive game title in action (e.g., on a casino game floor available for play) until a jackpot hits may not be desirable due to the nondeterministic nature of a jackpot triggering. Such techniques become very undesirable when gaming machines may dynamically install and uninstall games. As the number of progressive game titles and the corresponding progressive pools increase, keeping each pool separate hinders the ability for a gaming establishment to reconfigure gaming machines presenting poor-performing game titles to adapt to player demand.

Thus, there remains a need for systems and methods which ensure that, when the progressive pool associated with the progressive game title is removed from play, the players who have contributed to the pool are eventually paid back. Ideally, this should be accomplished without requiring that the poor-performing game title trigger a jackpot (or otherwise deplete the progressive pool down to the point where zero player contributions are left in the pool) before being removed. In this regard, there remains a need to address these and other concerns.

SUMMARY

Briefly, and in general terms, various embodiments are directed to systems and methods for providing management of contributions between pools in a progressive system.

In some embodiments, a progressive pool management system may include a non-transitory memory in communication with a processor. The non-transitory memory may have instructions stored thereon that, in response to execution by the processor, cause the processor to perform operations. The operations may include adding a first game having a progressive pool to a unified pool. Adding the first game may include assigning a first section of the unified pool to the progressive pool of the first game. The operations may include adding a second game having a progressive pool to the unified pool. Adding the second game may include assigning a second section of the unified pool to the progressive pool of the second game. The operations may include distributing contributions associated with the first game to the first section of the unified pool. The operations may include distributing contributions associated with the second game to the second section of the unified pool. The unified pool may include contributions associated with the first game and the second game such that the unified pool includes contributions for two different progressive pools.

In some embodiments, a system may include one or more memories in communication with one or more hardware processors of one or more computing devices. The one or more memories may have instructions stored thereon that, in response to execution by the one or more computing devices, cause the one or more computing devices to perform operations. The operations may include adding a first game having a progressive pool to a unified pool. Adding the first game may include assigning a first section of the unified pool to the progressive pool of the first game. The operations may include adding a second game having a progressive pool to the unified pool. Adding the second game may include assigning a second section of the unified pool to the progressive pool of the second game. The operations may include distributing contributions associated with the first game to the first section of the unified pool. The operations may include distributing contributions associated with the second game to the second section of the unified pool. The unified pool may include contributions associated with the first game and the second game such that the unified pool includes contributions for two different progressive pools.

In some embodiments, a progressive pool management method may include adding a first game having a progressive pool to a unified pool. Adding the first game may include assigning a first section of the unified pool to the progressive pool of the first game. The method may include adding a second game having a progressive pool to the unified pool. Adding the second game may include assigning a second section of the unified pool to the progressive pool of the second game. The method may include distributing contributions associated with the first game to the first section of the unified pool. The method may include distributing contributions associated with the second game to the second section of the unified pool. The unified pool may include contributions associated with the first game and the second game such that the unified pool includes contributions for two different progressive pools.

In some embodiments, a progressive pool management system may include at least one gaming machine configured to present a first game having a progressive pool. The progressive pool management system may include at least one gaming machine configured to present a second game having a progressive pool. The progressive pool management system may include a server in communication with the at least one gaming machine configured to present the first game and the at least one gaming machine configured to present the second game. The server may associate a section of a unified pool with the progressive pool of the first game. The server may associate a section of the unified pool with the progressive pool of the second game.

Other features and advantages will become apparent from the following detailed description, taken in conjunction with the accompanying drawings, which illustrate by way of example, the features of the various embodiments. Of course, the foregoing summary does not encompass the claimed invention in its entirety, nor are the embodiments intended to be limiting. Rather, the embodiments are provided as mere examples.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
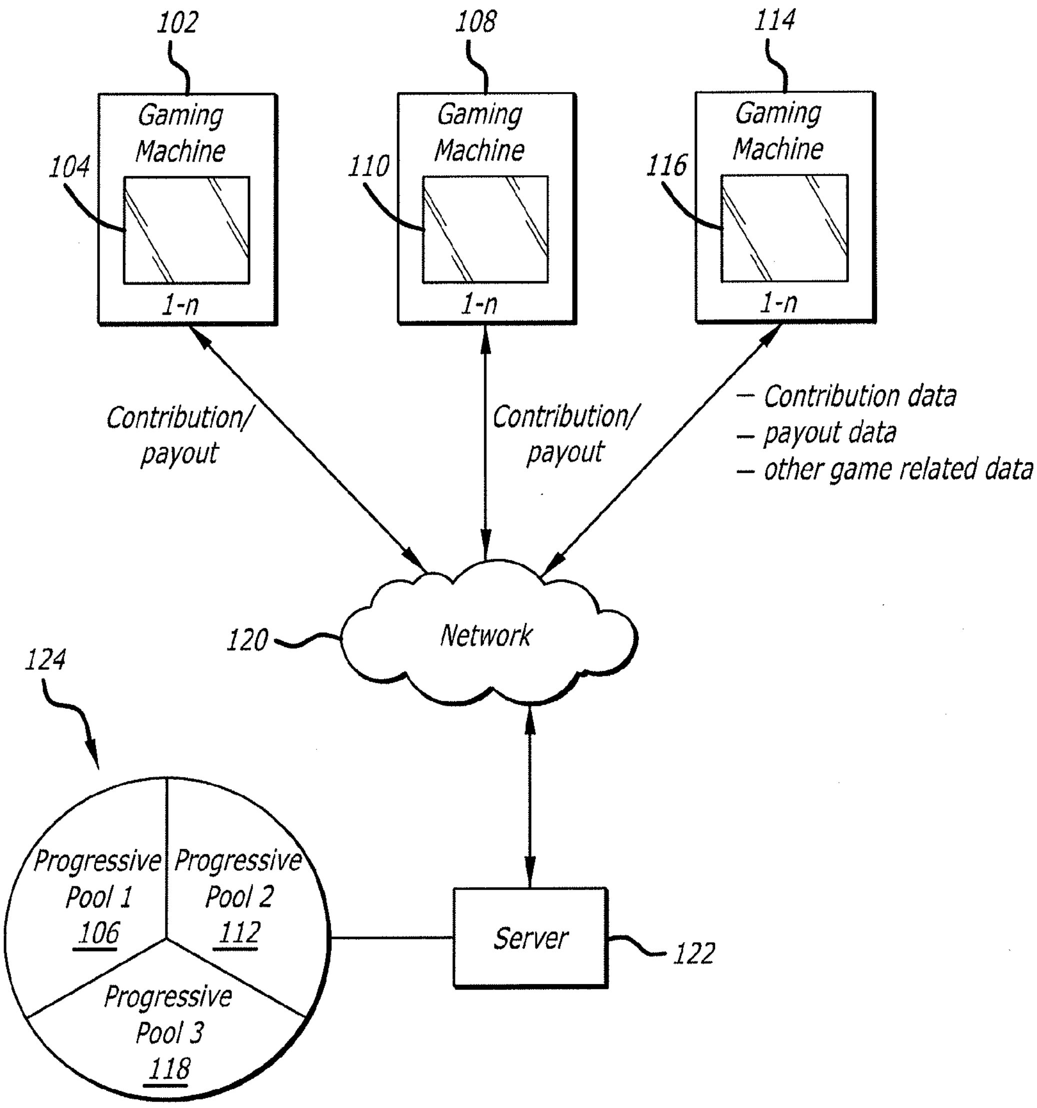
FIG. 1 shows one embodiment of a progressive pool management system.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

As used herein, the terms “for example,” “e.g.,” or any equivalent thereof is employed to mean “for example and without limitation.”

The headings and Abstract of the Disclosure provided herein are for convenience only and do not interpret the scope or meaning of the embodiments.

As used herein the term “physical” refers to tangible elements associated with a game. Such elements may take a variety of forms, including but not limited to playing cards, chips, dice, tiles, spinners, tokens or markers for instance chess pieces, checker pieces, pieces that represent players, houses in Monopoly, ships in Battleship, wedges in Trivial Pursuit, and the like.

As used herein, the term “virtual” refers to a logical construct of an element associated with a game and a visual display of the logical construct, where there is no physical counterpart to the particular element in use in the game as the game is being played. For example, a virtual game layout refers to the logical construct of a layout of a game and the visual display of the game layout (e.g., demarcations typically found on a board or felt).

As used here in the term “representation” or “visual representation” refers to a visual display of an icon or other graphical element that is representative of a physical object associated with a game. For example, a visual icon may be displayed representing a physical playing card, physical chip or physical dice that are in use in the game.

As used herein, the terms “touch screen,” “touchscreen,” or “touch screen display” refer to any touch device or any electronic visual display that can recognize a touch event from a user (e.g., using one or more fingers, or a stylus), such as but not limited to, a resistive touch screen, a surface acoustic wave (SAW) touch screen, a capacitive sensing touch screen, an infrared touch screen (e.g., an infrared acrylic projection touch screen), an optical imaging touch screen, touch screens that detect piezoelectricity, or acoustic pulse recognition touch screens.

Figure 2:
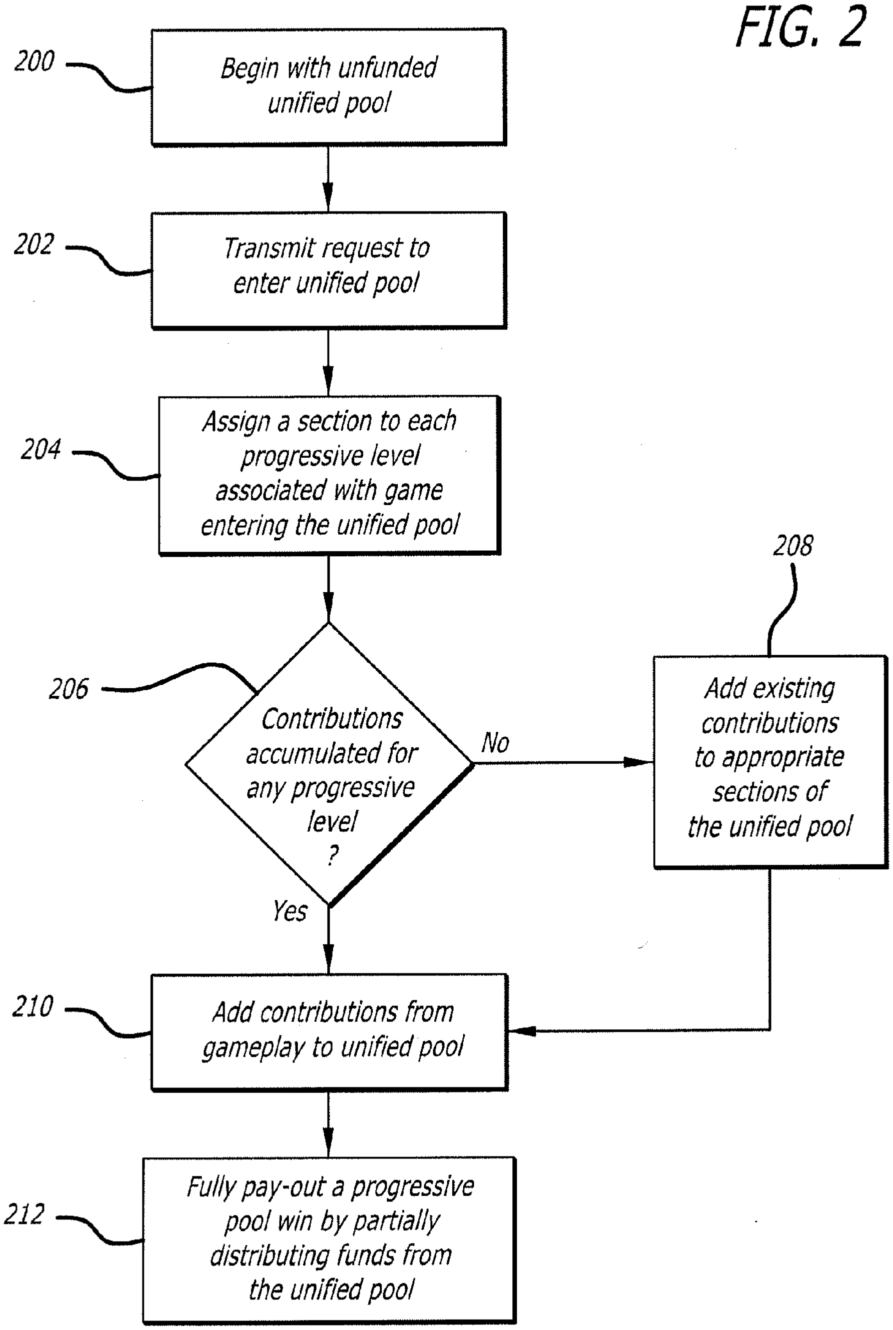
FIG. 2 depicts a flow diagram according to one embodiment of the progressive pool management system.

Referring now to the drawings, wherein like reference numerals denote like or corresponding parts throughout the drawings and, more particularly to FIGS. 1-2, there are shown various embodiments of a progressive pool management system 100 and methods associated therewith. Among other things, the progressive pool management system 100 enables easy management of multiple progressive games. The progressive pool management system 100 enables central accounting for multiple progressive pools. The progressive pool management system 100 enables a true multigame environment where games may be offered to players with the simplicity afforded by the system. The system manages a plurality of progressive pools associated with a plurality of games when they enter and exit the centralized, accounting-based unified pool. The progressive pool management system 100 enables multi-denomination progressive pools with central accounting.

The progressive pool management system 100 and associated methods enables partial pay-out of the contents (i.e., funds) of a progressive pool. The partial pay-out feature or algorithm enables the progressive pool management system 100 and associated methods to accumulate multiple progressive pools into a single pool. In this manner, the partial pay-out feature may be used to partition, or otherwise sectionalize, funds (e.g., contributions) associated with one pool from another pool, despite the funds of both pools being commingled into a single pool. For example, a partial pay-out from the single pool may equate to a total pay-out from one of the multiple pools whose funds were added to the single pool. Otherwise stated, instead of having a progressive pool for each game pay table position that may hit a progressive pool jackpot (or a progressive win other than a jackpot), the winning amount may be extracted from a single pool representing a plurality of pools by partially paying out from the single pool. The partial pay-out algorithm sectionalizes the unified pool into views or compartments that behave similarly to multiple pools, but exist more momentarily and dynamically. Since the accounting for multiple pools is combined into a single, unified pool, additional possibilities are created for cross-sectional cooperation in management of available pools.

As used herein, a "unified pool" refers to a single pool that contains accumulated funds from a plurality of pools. The accumulated funds may be, for example, contributions from players; or contributions from a game, gaming machine, or gaming establishment. As used herein, a "sub-pool" refers to a progressive pool that has been combined with at least one other sub-pool to form a unified pool.

Referring now to FIG. 1, one embodiment of a progressive pool management system 100 is shown with a unified pool 124. As shown, one or more gaming machines 102 present one or more games 104 that may feed contributions to a first progressive pool 106; one or more gaming machines 108 present one or more games 110 that may feed contributions to a second progressive pool 112; and one or more gaming machines 114 present one or more games 116 that may feed contributions to a third progressive pool 118. Each game or gaming machine may be associated with a progressive pool. In this regard, all games (e.g., no matter the title) played on a specific gaming machine may feed the same progressive pool. In other embodiments, the progressive pool to which contributions are associated may be based on the game rather than the gaming machine. In this regard, a single gaming machine may feed more than one progressive pool depending on the game that is played on it. For example, a first player may play Game 1 on a gaming machine that feeds contributions to progressive pool 106. However, a second player may reconfigure the same gaming machine to play Game 2 that feeds contributions to progressive pool 112. Therefore, a reference to progressive pool being associated with a game, may additionally or alternatively mean that the gaming machine on which the game is played is associated with the progressive pool.

The contributions (e.g., monetary amounts extracted from each wager made by a player) may be transmitted over a wired or wireless network 120 to a server 122. The server 122 may receive and process the received contributions to determine which unified pool to distribute the received contributions. Transmitted contributions may include data to identify, among other things, the gaming machine from which the contribution was generated, the game from which the contribution was generated, the amount of the contribution, the time and date of the contribution, and/or the progressive pool to which the contribution is destined to feed. While only one unified pool 124 is depicted in FIG. 1, other embodiments may include more than one unified pool. For example, one unified pool may include 10 sub-pools, while a second unified pool may include 4 sub-pools. It should be appreciated that while the server 122 is shown in FIG. 1 as a separate processing unit from the one or more gaming machines, one or more of the gaming machines may function as the server in other embodiments. In such embodiments, the gaming machines may transmit data to the gaming machine(s) handling server responsibilities (e.g., determining which unified pool to distribute the received contributions).

In the embodiment shown, the server 122 distributes the received contributions associated with progressive pools 106, 112, and 118 to the unified pool 124 based on, for example, the contribution data. Once the funds of the progressive pools 106, 112, and 118 are combined into the unified pool 124, the progressive pools may be considered sub-pools.

According to some embodiments, a unified pool may have two dynamic metrics on which calculations may be based. One dynamic metric includes a "cost-to-jackpot" space ("CTJ-space"), which may be used to track the cost-to-jackpots of all games currently attached to, or otherwise associated with, the unified pool 124. The CTJ-space metric may be used to determine logical sections of the unified pool 124 assigned to specific game levels (e.g., a first level win resulting in a first pay-out, a second level win resulting in a second pay-out greater than the first pay-out, and a third level win resulting in a jackpot). The CTJ-space metric may include a total reserved CTJ which is adjusted as games are added, and individual assignments of that reserved CTJ to logical game levels. For example, the total reserved CTJ refers to the CTJ of each section of the unified pool added together.

Another dynamic metric may include a contribution space where the contributions input into the unified pool 124 are accumulated into sections (i.e., the contributions are sectionalized). The contribution space acts as a progressive pool identifier. In this regard, the unified pool 124 may be viewed in two ways: (1) the total amount of contributions in the unified pool 124 and (2) the total amount of contributions in each section (i.e., sub-pool). As each game is played, the server may use these metrics to respond to game events received from gaming machines to ensure proper pay-out of contributions from the unified pool 124 to the appropriate player at a winning gaming machine that triggered a progressive pool win.

In some embodiments, adding a progressive pool to a unified pool involves sectionalizing the unified pool to enable proper accounting across multiple sub-pools. Adding a pool to the unified pool may be considered a game entry event because the pool is associated with and feeds the section ultimately assigned in the unified pool. Sectionalizing a unified pool may be based on an association being made with a section (i.e., a pay-out pool only available to the games with which it is associated) of the unified pool and one or more games. The server may assign an unassigned section of the unified pool (possibly with zero contributions therefore having a monetary value of $0.00) to one or more games. This assignment locks the newly-assigned section of the unified pool to the one or more games. For multilevel progressive games, the assigned section may include sub-sections for each progressive pay-out level. In this regard, the server may also assign sub-sections of a section of the unified pool to one or more games.

An assigned section may correspond to a single sub-pool. For example, referring to FIG. 1, the unified pool includes three sections: one section for sub-pool 106 associated with one or more games 104, another section for sub-pool 112 associated with one or more games 110, and another section for sub-pool 118 associated with one or more games 116. According to some embodiments, when all games are completed in a unified pool section, the one or more games locked to the section may be unlocked (i.e., the association of the unified pool section with the games may be removed).

In some embodiments, upon adding a game to the unified pool, the server will lock the section (and sub-sections if assigned for a multilevel progressive game) of the unified pool in proportion to the CTJ of the game level or levels. A game level is a pay-out based on one or more defined game outcomes. For example, a first game outcome may pay a first progressive amount, a second game outcome may pay a second progressive amount, a third game outcome may pay a third progressive amount, and a fourth game outcome may pay a jackpot (i.e., the highest progressive amount). Each reserved (i.e., assigned) section or sub-section grows, or otherwise increases in value, as necessary, if there are not enough contributions reserved (i.e., associated with each section/sub-section) upon the game entering the unified pool.

According to some embodiments, each section may increase in value as follows: A unified pool may include a reserved cost-to-jackpot of "RCTJ" and unlocked accumulated contributions "UAC." A progressive game entering the unified pool may have a cost-to-jackpot "GCTJ." Upon entry into the unified pool, a CTJ space of GCTJ will be reserved for the game, and the initial available contributions available to the game (i.e., sub-pool) may be CUL*(GCTJ/RCTJ). If RCTJ is less than GCTJ, then the unified pool may grow the CTJ space for the sectionalized sub-pool by GCTJ-RCTJ, and the initial available contributions to the game (i.e., sub-pool) may be CUL. Following this initiation into the unified pool, the game will be associated with the locked section in the unified pool. Contributions subsequent to the game's entry into the unified pool (e.g., player contributions extracted from wagers) will be assigned to this locked section until an unlock event occurs. Otherwise stated, contributions that come to the unified pool from a gameplay event are distributed to the appropriate section (i.e., sub-pool) that is associated with the game or game level for multilevel progressive games. In this regard, a game having a single progressive pay-out level, such as a jackpot, may only have one section assigned to it. A game having N number of progressive pay-out levels (N representing any number) may have N sections assigned to it (a section for each pay-out level). The contributions are tracked per section so that the funds remain segregated from other coexistent sections within the unified pool by assignment feature or the partial pay feature.

As an example, a partial pay event may include a progressive pay-out event (e.g., a jackpot progressive level pay-out event or a lesser progressive level pay-out event). For example, assume a player triggers a progressive pay-out event that is a jackpot at a gaming machine. While the jackpot associated with the progressive pay-out event will be fully paid to the player playing the game that triggered the jackpot, the jackpot is extracted from the unified pool using a partial pay algorithm. The partial pay algorithm determines which section of the unified pool the jackpot event is associated with and pays the associated accumulation of contributions from the associated section to the player. The game may also pay the pay table value of the particular game level (commonly referred to as the reset level).

Referring again to FIG. 1, one embodiment of a progressive pool management system 100 is shown with a unified pool 124 having three sections 106, 112, and 118, as previously disclosed herein. These three sections may have been added to the unified pool according to the methods disclosed herein. However, a game exit event may affect the status of sections 106, 112, or 118 (or any section in a unified pool). A game exit event may occur when the games assigned to (i.e., associated with) a unified pool section are not currently being played by any players and are not the active game on any gaming machine. A game exit event may occur when the games assigned to a unified pool section are no longer locally stored on any gaming machine. Additionally, a game exit event may occur when the games assigned to a unified pool section are no longer available in any multigame suite or menu for selection by a player. Furthermore, a game exit event may occur when the games assigned to a unified pool section are no longer available due to some choice by a casino operator (not a player).

A game exit event "cleans up" one or more unified pool sections associated with a game removed from the unified pool. Otherwise stated, the funds in the unified pool section(s) may be moved to another section to enable the system to pay out player contributions no longer available in the game previously associated with the unified pool section by virtue of the game exit. According to one embodiment, a game exit event may cause the contributions of the unified pool section to be proportionally moved to an unassigned section of the unified pool, and also cause the total CTJ of the unassigned unified pool section to be decreased by the CTJ of the unified pool section that was cleaned up (i.e., removed). According to this embodiment, the unassigned pool-section of the unified pool will have associated CTJ equal to the difference between the largest total CTJ the unassigned pool has had and its current assigned CTJ. If a game exits (i.e., disassociated with a section of the unified pool) and is then immediately re-entered (i.e., associated with a section of the unified pool), the proportion of the game's CTJ to the total CTJ will ensure that the game gets some of its contributions back upon re-entry. Note there may be contributions left for other games to be assigned when those other games enter to the unified pool and are assigned sections.

In some embodiments, this game exit event is good to use when the number of games participating in the unified pool is very volatile (i.e., the number games entering and exiting the pool is volatile), and there is a maximum CTJ that is attained on a fairly frequent interval. This option enables funds accumulated for one game to be transferred to a different game upon the different game entering the unified pool. In this regard, this game exit event keeps progressive activity interesting by providing different games for a player to play to win back funds previously acquired from a different game.

In some embodiments, this option (i.e., proportionally assigning contributions of a game upon re-entry) may not be optimum if there is a maximum CTJ attained at some point that is never attained again, or if the movement between different CTJs is slow. Accordingly, there may be accumulated contributions that will rarely or never get assigned to a game. The progressive pool management system 100 is configured to prevent or at least minimize this type of occurrence. All funds should eventually make their way into a pool.

According to another embodiment, a game exit event may cause the contributions of the unified pool section to be moved to an unassigned section of the unified pool. This embodiment ensures that every time a game is removed (i.e., unassigned) from a section of the unified pool, all of the accumulated contributions corresponding thereto will be assigned immediately to the next game added to the unified pool (assigning a section in the process). According to some embodiments, the total CTJ of the unassigned section of the unified pool will be the total assigned CTJ for the new section added. The unassigned contributions will have a CTJ of 0, and any positive game will immediately be assigned the remains of the unassigned contributions from the proportional distribution algorithm previously disclosed. This solves the issue of unassigned funds after a game has been removed from the unified pool.

Moving all of the accumulated contributions in the unassigned unified pool section to the next assigned unified pool section upon entry of a new game also solves another issue. Specifically, this issue related to removing a game from the unified pool and immediately re-entering the removed game into the unified pool, which may (in the proportional distribution strategy) return a different progressive structure. According to this embodiment, an immediate exit and re-enter (without other sections assigned in between) will re-assign the exact amount of accumulated contributions previously unassigned.

Also, moving all of the accumulated contributions in the unassigned unified pool section to the next assigned unified pool section upon entry of a new game does not always produce results that would be expected. One example of an unexpected result includes a first game having accumulated $100,000 in contributions for a $100,000 CTJ game that has a single progressive level (i.e., the jackpot) and is no longer being played. Once the first game is removed from the unified pool, a second game having multiple progressive levels may enter the unified pool. In this example, the second game may have seven progressive levels. Each progressive level may have different odds of triggering. The odds of triggering a progressive level may become less likely as the progressive level increases. For example, the first progressive level may have a one in twenty-five chance of triggering during gameplay, the second progressive level may have a one in fifty chance of triggering during gameplay, and the seventh progressive level may have a one in five million chance of triggering during gameplay. Each progressive level may have a different starting amount when the second game is initialized. According to one embodiment, the starting amount increases in value from the smallest to the largest monetary value with the smallest amount corresponding to the first level and the largest starting amount corresponding to the seventh starting amount. For example, progressive levels one through seven may respectively have starting amounts at $10, $50, $100, $250, $1,000, $2,500, and $10,000.

As previously disclosed herein, a section may be assigned to the newly added second game for each progressive pay-out level. The order in which each progressive level for the second game is assigned to a section in the unified pool may be random or according to a predetermined order. Therefore, according to one embodiment, if the lowest progressive level (the first level in this example) registers first (i.e., assigned a section in the unified pool), then the lowest level may be assigned (1) the $100,000 in the unassigned section of the unified pool and (2) a starting amount such as $10. Of course, in other embodiments, each progressive level may not include a starting amount upon the second game starting up. This may be true even though the first level will typically hit (i.e., trigger) at a monetary value far less than $100,000. For example, the first level may usually trigger (due to the odds) between $10 and $30. Therefore, the $100,000 accumulation assigned to the first progressive level becomes far easier for a player to win. Similarly, results would occur if other low progressive levels registered first.

According to another embodiment, the progressive pool management system 100 may determine the odds associated with each of the progressive levels of the second game. The system may also determine the different wager amounts available in the second game. For example, the server 122 may query one or more gaming machines presenting the second game for odds information. The queried one or more gaming machines may respond to this request by sending game information over the network. The game information may include any information related to the game, such as but no limited to, odds information and wager information. In another embodiment, when a second game enters the unified pool, one or more gaming machines presenting the second game may automatically transmit any information related to the second game to the server 122. The progressive pool management system 100 may determine the amount of money in the unassigned section of the unified pool section prior to assigning it to a section. The progressive pool management system 100 may use game information specific to the second game (e.g., odds information and wager information), and unassigned section monetary value to determine which progressive level section(s) to assign the accumulations in the unassigned section of the unified pool.

For example, the progressive pool management system 100 may assign the accumulations in the unassigned section to the section corresponding to a progressive level having a CTJ closest to $100,000. The CTJ for each progressive level may be calculated based on any wager amount (usually max bet but may be a different wager than max bet) and the odds associated with each progressive level. For example, if the first progressive level has a 1 in 25 chance of triggering a pay-out and the max bet is $1.00, then the CTJ for the first progressive level would be $25. As another example, if the third progressive level has a 1 in 100 chance of triggering a pay-out and the max bet is $1.00, then the CTJ for the third progressive level would be $100. In this manner, the progressive pool management system is able to calculate the CTJ for each progressive level. Of course, in some embodiments, the CTJ for each progressive level may already be known and transmitted to the server 122 possibly along with other game-related information such as odds information and wager information.

According to one embodiment, once the progressive pool management system 100 has determined the CTJ for each progressive level, the system may assign the unassigned section of the unified pool based on this determination. For example, with respect to the $100,000 example disclosed above, the system may assign these funds to the section corresponding to the progressive level having a CTJ closest to $100,000. As another example, with respect to the $100,000 example disclosed above, the system may assign these funds to the section corresponding to the progressive level having the lowest CTJ. As another example, with respect to the $100,000 example disclosed above, the system may assign these funds to the section corresponding to the progressive level having the highest CTJ.

According to another embodiment, once the progressive pool management system 100 has determined the CTJ for each progressive level, the system may assign the unassigned section of the unified pool to a plurality of sections if no single section has a CTJ large enough to accommodate the value of the unassigned funds based on this determination. For example, with respect to the $100,000 example disclosed above, the system may assign these funds to a plurality of sections corresponding to different progressive levels of the second game. Assume, for example, that one of the progressive levels has a CTJ of $80,000, and another progressive level has a CTJ of $20,000. The system may determine to assign $80,000 of the $100,000 in the unassigned section to the section corresponding to the progressive level that has a CTJ of $80,000. The system may also determine to assign the remaining $20,000 of the $100,000 in the unassigned section to the section corresponding to the progressive level that has a CTJ of $20,000. The system may have selected these two sections because the combined CTJ is closest to $100,000. In this regard, it is appreciated that the system may determine what combination of CTJ's equate to or come closest to the amount in the unassigned section of the unified pool. If there is more than one combination of progressive pools that would equal the same combined CTJ, the system may select the combination involving the lowest number (or the highest number) of progressive levels, and therefore, sections.

According to another embodiment, the progressive pool management system 100 may evenly distribute the funds across all sections of the newly-entered game. For example, if the second game had 10 progressive levels (and therefore 10 sections), each section would receive one-tenth the amount of funds in the unassigned section of the unified pool.

In some embodiments, the progressive pool management system 100 may assign the funds in the unassigned section of the unified pool according to a bleed-off strategy. According to this embodiment, the unassigned contributions may be assigned to existing sections corresponding to one or more games at a defined rate. The rate may be linear or non-linear. This embodiment ensures that all contributions in the unassigned section of the unified pool will ultimately be assigned to a section after a set period of time. For example, in the following scenario a unified pool includes two sections for two different progressive pools. One section is assigned to the progressive pool for game A, and the other second is assigned to the progressive pool for game B. The unified pool also includes an unassigned section containing contributions left over from game C that exited the unified pool.

According to other embodiments, the system does not wait for a period of time (e.g., one or more days, weeks, or months) before executing the bleed-off strategy. Instead, the system immediately begins to bleed-off the contributions in the unassigned section to existing sections. During bleed-off, if a new game enters the unified pool, any one of the embodiments disclosed above may be used to assign the contributions in the unassigned section. If any contributions are still left in the unassigned section, execution of the bleed-off strategy may continue.

With respect to the bleed-off, the contributions in the unassigned section may be evenly or unevenly assigned to each section in the unified pool corresponding to a game. For example, according to one embodiment, a portion of the contributions in the unassigned section is assigned to each section corresponding to a game in the unified pool. In this example, the sections corresponding to games A and B would each receive (i.e., be assigned) the portion of the contributions in the unassigned section every minute, 5 minutes, 30 minutes, 60 minutes, 6 hours, 12 hours, 24 hours, a week, or any other period of time. For example, if the bleed-off cycle (i.e., the assignment cycle) is every day and the portion is 1% of the total contributions in the unassigned section, this would result in the unassigned section being fully assigned in 50 days if the portion is being assigned to two sections and no other changes occur in the interim (e.g., adding or removing games from the unified pool). In this example, the 1% portion is not recalculated after each assignment (i.e., the 1% portion may stay the same to prevent diminishing returns). In some embodiments, the 1% portion may be recalculated when new funds are added to the unassigned pool or when a sizable portion is extracted beyond the 1% portion due to, for example, a new game joining the unified pool. The specific example of a 1% portion is simply an example and that other portion amounts are contemplated (e.g., any percentage such as 5%, 10%, 20%, 30%, or 50%).

According to one embodiment, the system waits for a period of time (e.g., one or more days, weeks, or months) before executing the bleed-off strategy. If a new game enters the unified pool, any one of the embodiments disclosed above may be used to assign the contributions in the unassigned section. However, if not all of contributions in the unassigned section are assigned, then the period of time continues to elapse for the remaining contributions. Once the period of time elapses, the system may execute the bleed-off strategy.

In some embodiments, the progressive pool management system 100 may assign the funds in the unassigned section of the unified pool according to a "ghost sections" strategy. According to this embodiment, when a game exits, the system may store information related to the game level (i.e., the state of the section), and the section is assigned to the game level. Then, when the same game creates a new pool section (i.e., re-enters the unified pool), the previously stored information related to the game level that was removed from the unified pool may be used to assign a section to the re-entering game level. For example, according to one embodiment, the system may determine that the amount of funds available in the unassigned section of the unified pool. Next, the system may determine the funds in the section assigned to the game level at the time the associated game was removed from the unified pool. If the funds in the unassigned section are more than or equal to the amount of the contributions that were in the previously removed game section (at the time of exit), then the system may restore the new section to the same state for the re-entering game based on the stored section information. If there are less funds in the unassigned section, the system may assign all of the funds in the unassigned section to the re-entering section to restore the re-entering section to its state at exit as closely as possible. Such embodiments ensure that games which exit frequently will restore their progressives as best as possible from the available contributions in the unassigned pool section, even for multilevel games. In other embodiments, the system may use any other entering technique disclosed herein. For example, the system may not attempt to return the re-entering game level to its state upon exiting the unified pool.

All of the apportionment (i.e., fund assignment) techniques disclosed herein are "fair" to a player because divesting (i.e., paying out) the contributions accumulated in each section is controlled by the game with which each section is associated. The contributions assigned to each section accumulate during gameplay just like a normal progressive, so the pay tables are unaffected. In this regard, the progressive pool management system 100 enables contributions accumulated from gameplay associated with a first game to be transferred to a pool (i.e., section) associated with a different game. The progressive pool management system 100 enables a unified progressive pool where money (i.e., contributions) need not be transferred in and out simply because the environment includes multiple games entering and exiting the system. Some of the techniques may favor heavily variable environments, whereas other techniques may be better suited for slow accumulation scenarios. Some techniques disclosed herein may cater to desires to keep accumulated contributions consistent across multiple instances of a game, whereas other techniques may provide for as much accumulated contributions available as possible at any point.

One Example (Embodiment) of the Progressive Pool Management System:

Referring now to FIG. 2, one embodiment of a flow diagram for the progressive pool management system 100 is shown. As step 200, the process begins with an empty unified pool. Otherwise stated, the unified pool has not assigned any sections to any games because the unified pool is being initiated. At step 202, a gaming machine may transmit a request to a server to enter a game into the unified pool. Additionally or alternatively, the server may transmit a request to the gaming machine to identify one or more games that the gaming machine is configurable to present. The gaming machine may transmit game identification data regarding which games it is configurable to present. The server may receive and process this game identification information to determine whether any of the games that the gaming machine is configurable to present have, or have not, been entered into the unified pool. If a game has not been entered, the server may automatically take the necessary steps to add the game to the unified pool. Alternatively, the server may transmit a request to a casino operator (i.e., a gaming establishment operator, manager, or the like) to determine whether the game should be added to the unified pool. The request may be presented on a display associated with any computing device (e.g., a mobile phone). The casino operator may input data using the computing device, which may in turn transmit data to the server regarding whether the game should or should not be entered into the unified pool. If a game is to be entered into the unified pool, the server assigns a section to each progressive level associated with the game. In this regard, following step 202, the server may (at step 204) assign a section to each progressive level associated with the game being entered into the unified pool.

At step 206, the server may determine whether any progressive level associated with the game has accumulated contributions from previous gameplay prior to entering the unified pool. If there are no contributions (e.g., the game just hit the gaming floor), then the process may continue to step 210. If there are contributions already accumulated at the time the game is being entered into the unified pool, then the server may, at step 208, assign or otherwise associate the monetary value from each progressive level to the appropriate section.

At step 210, the gameplay of the game results in contributions that are added to the unified pool. As the game is played, all contributions may be added directly into the appropriate section for the game. The section(s) assigned to the game equal the total progressive pool for that game. When a player triggers a progressive level of the game, a full pay-out of the progressive to the player is initiated at step 212 resulting in a partial pay-out from the unified pool.

According to some embodiments, when a game is added to an empty unified pool, the total cost-to-jackpot of the unified pool equals the cost-to-jackpot(s) of the added game. The contributions accumulated begin with 0. Since the accumulations begin at 0 for each progressive level, the pay-out of each progressive may equal the line-pay until a game is played to establish contributions. As games are played, all contributions are extracted directly into the section(s) for each game. The section(s) for each game equals the total pool for each game.

If the game that entered into the unified pool (discussed in reference to FIG. 2) ever exits the unified pool, the section(s) assigned to the game may be unlocked. Unlocking the section(s) may result in moving (i.e., assigning or otherwise associating) all contributions corresponding to each section to the unassigned section of the unified pool. The total cost-to-jackpot of the unified pool upon entry of a new game at this point has several possibilities depending on the strategy chosen for CTJ consumption.

In the first strategy, the reserved CTJ is never released. There are three different embodiments: (1) a new game CTJ is greater than reserved CTJ; (2) a new game CTJ equals reserved CTJ; and (3) a new game CTJ is less than reserved CTJ.

New Game CTJ>Reserved CTJ

If the new game has a larger CTJ than the amount reserved by the first game (i.e., the game that exited), then the new game will grow the pool's reserved CTJ to equal its own CTJ and all contributions in the unassigned section of the unified pool will move to the new game. In this manner, after the new game is entered into the unified pool, the unified pool configuration may be described as follows:

Total CTJ=new game CTJ

Total contributions=original game contributions (i.e., the game that exited)

New game contributions=original game contributions

Unassigned section CTJ=0

Unassigned section contributions=0

New Game CTJ=Reserved CTJ

If the new game has a CTJ equal to the amount reserved by the first game, then the result may be the same as when the new game CTJ is greater than the amount reserved by the first game.

New Game CTJ<Reserved CTJ

If the new game has a smaller CTJ than the amount reserved by the first game, then the unified pool may reserve a new section with a contribution amount proportional to the ratio of the new game CTJ and the reserved CTJ. In this regard, the unified pool configuration after the new game has been entered by the unified pool may be described as follows:

Total CTJ=original game CTJ

Total contributions=original game contributions

New game contributions=(original game contributions*(new game CTJ/original game CTJ))

Unassigned section CTJ=(original game CTJ−new game CTJ)

Unassigned section contributions=original game contributions*(1−(new game CTJ/original game CTJ))

Total CTJ Adjusted on Remove

If the Total CTJ is adjusted to 0 on removal, then the pool algorithm behaves exactly like the new game CTJ>=reserved CTJ case. The final configuration appears as:

Total CTJ of unified pool=new game CTJ

Total contributions=original game contributions

New game contributions=original game contributions

CTJ of unassigned section=0

Contributions of unassigned section=0

Another Example (Embodiment) of the Progressive Pool Management System:

According to this example, two games (game X and game Y) are added to an empty unified pool. Each game has a different CTJ. After a section is assigned to the progressive level for each game, contributions through gameplay on games X or Y are added to the appropriate section. After some contributions have accumulated in the assigned section for each game, one of the games is removed, and another game may be added. For example, if game Y is removed and game Z is added, the adding of game Z brings the total CTJ of the unified pool to the value "CTJ of game X+CTJ of game Z." In this manner, the unified pool configuration after game Y is removed and game Z is entered into the unified pool may be described as follows, depending on the CTJ of Game Z:

If CTJ of Game Z (New/Added Game)>=CTJ of Game Y (Removed Game) or Total CTJ of Unified Pool Adjusted on Exit Total CTJ of unified pool=CTJ of game Z+CTG of game X Total contributions=contributions of game Y+contributions of game X Contributions of game Z=contributions of game Y CTJ of unassigned section=0

Contributions of unassigned section=0

If CTJ of Game Z (New/Added Game)<CTJ of Game Y (Removed Game):

Total CTJ=CTJ of game Y+CTJ of game X

Total contributions=contributions of game Y+contributions of game X

New game contributions=contributions of game Y*(CTJ of game Z/CTJ of game Y)

CTJ of unassigned section=CTJ of game Y−CTJ of game Z

Contributions of unassigned section=contributions of game Y*(1−(CTJ of game Z/CTJ of game Y))

Still Another Example (Embodiment) of the Progressive Pool Management System:

According to this example, the unified pool has a plurality of games played that are assigned a section, and the unified pool has a reserved-but-not-assigned section. A new game is then added to the unified pool followed by gameplay. This example starts with the following distribution prior to the new game being added:

Total CTJ=start Total CTJ (e.g., combined CTJ of the plurality of games that excludes the CTJ of the new game)

Total contributions=start Total contributions (e.g., combined contributions associated with each of the plurality of games that excludes any contributions of the new game)

Unassigned section CTJ=start Unassigned CTJ (e.g., the CTJ of the unassigned section of the unified pool right before or at the time the new game is added)

Unassigned section contributions=start Unassigned contributions (e.g., the contributions of the unassigned section of the unified pool right before or at the time the new game is added)

After the new game is added, the distribution may be described as follows:

Total CTJ=start Total CTJ+new game CTJ

Total contributions=start Total contributions+new played (i.e., the contributions associated with the new game)

New game contributions=start Unassigned contributions*(new game CTJ/start Unassigned CTJ)+new played Unassigned section CTJ=start Unassigned CTJ−new game CTJ Unassigned section contributions=start Unassigned contributions*(1−(new game CTJ/start Unassigned CTJ))

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer-readable medium for use by or in connection with any computer and/or processor-related system or method. In the context of this document, a memory is a computer-readable medium that is an electronic, magnetic, optical, or other another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms taught herein are capable of being distributed as a program product in a variety of forms, and that an illustrative embodiment applies equally regardless of the particular type of signal-bearing media used to actually carry out the distribution. Examples of signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, gaming machine, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server, such as a gaming server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such as functioning as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. For example, as disclosed herein, touch devices such as a virtual button deck may provide sensory feedback to a player. The virtual button decks may transmit information related to the sensory feedback and a player's interaction with the virtual button deck to one or more processors. The one or more processors may be any electrical hardware unit, such as but not limited to an integrated circuit, a display manager, a central processing unit, a graphics processing unit, or any other processing unit.

It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

From the foregoing it will be appreciated that, although specific embodiments have been described herein for purposes of illustration, various modifications may be made without deviating from the spirit and scope of the teachings. Accordingly, the claims are not limited by the disclosed embodiments.

What is claimed:

1. A system to control combined contributions from a plurality of gaming devices, the system comprising:

a server storing a unified pool; and a plurality of gaming devices each in communication with the unified pool, each gaming device comprising:

(i) at least one display device comprising a touch interface display displaying a virtual button deck to provide sensory feedback to a player, (ii) a plurality of input devices including:

(a) an acceptor of a wager associated with a first monetary value, wherein a contribution is extracted from each wager made by a player at a gaming machine, (b) a payout apparatus associated with a winning amount, (iii) at least one gaming device processor, (iv) at least one gaming device memory device storing a gaming component, wherein the at least one gaming device memory device is in communication with the at least one gaming device processor, and the at least one gaming device memory device-has instructions stored thereon that, in response to execution by the at least one gaming device processor, cause the at least one gaming device processor to perform operations;

wherein each gaming device of the plurality of gaming devices adds at least one game having a progressive pool to the unified pool, wherein adding the at least one game includes assigning a section of the unified pool dedicated to the gaming device to the progressive pool of the at least one game, wherein the unified pool is divided into plurality of individual sections, each section dedicated to the progressive pool from each gaming device of the plurality of gaming devices; and wherein the server distributes contributions associated with the at least one game from each gaming device to the section of the unified pool dedicated to the gaming device, wherein the unified pool includes contributions associated with the at least one game from each gaming device of the plurality of gaming devices, and therefore enabling the unified pool to:

include contributions for a plurality of different progressive pools from the plurality of gaming devices in the plurality of individual sections of the unified pool, maintain separation between the contributions of the plurality of different progressive pools, and pay-out accumulated contributions, from a corresponding section, to a player at a winning gaming device that triggered a win.

2. The system as set forth in claim 1, wherein the operations further comprise paying out the contributions associated with the at least one game from each gaming device of the plurality of gaming devices, from the corresponding section of the unified pool.

3. The system as set forth in claim 1, wherein the operations further comprise processing a progressive pool trigger event associated with the at least one game from each gaming device of the plurality of gaming devices.

4. The system as set forth in claim 3, wherein the operations further comprise executing a partial-pay algorithm resulting in the contributions associated with the progressive pool trigger event being extracted for payment.

5. The system as set forth in claim 1, wherein the operations further comprise removing the at least one game from each gaming device of the plurality of gaming devices from the unified pool.

6. The system as set forth in claim 5, wherein removing the at least one game from each gaming device of the plurality of gaming devices, from the unified pool results in assigning contributions associated with the removed at least one game to an unassigned section of the unified pool.

7. The system as set forth in claim 6, wherein the operations further comprise adding a new game having a progressive pool to the unified pool, wherein adding the new game includes assigning a section of the unified pool to the progressive pool associated with the new game.

8. The system as set forth in claim 7, wherein the operations further comprise assigning the contributions assigned to the unassigned section of the unified pool to the section associated with the progressive pool associated with the new game.

9. A system, comprising:

a server storing a unified pool; and a plurality of computing devices each in communication with the unified pool, each computing device comprising:

(i) at least one display device comprising a touch interface display displaying a virtual button deck to provide sensory feedback to a player, (ii) a plurality of input devices including:

(a) an acceptor of a wager associated with a first monetary value, wherein a contribution is extracted from each wager made by a player at a gaming machine, (b) a payout apparatus associated with a winning amount, (iii) at least one hardware processor, (iv) at least one computing device memory device storing a gaming component, wherein the at least one computing device memory device is in communication with the at least one hardware processor, and wherein the at least one computing device memory device has instructions stored thereon that, in response to execution by the at least one hardware processor, cause the at least one hardware processor to perform operations;

wherein each computing device of the plurality of computing devices adds at least one game having a progressive pool to a unified pool, wherein adding the at least one game includes assigning a section of the unified pool dedicated to the computing device to the progressive pool of the game, wherein the unified pool is divided into a plurality of individual sections, each section dedicated to the progressive pool from each computing device of the plurality of computing devices; and wherein the server distributes contributions associated with the at least one game from each computing device of the plurality of computing devices to the section of the unified pool dedicated to the computing device, wherein the unified pool includes contributions associated with the at least one game from each computing device of the plurality of computing devices, therefore enabling the unified pool to:

include contributions for a plurality of different progressive pools from the plurality of computing devices in the plurality of individual sections of the unified pool, maintain separation between the contributions of the plurality of different progressive pools, and pay-out accumulated contributions, from a corresponding section, to a player at a winning gaming device that triggered a win.

10. The system as set forth in claim 9, wherein the operations further comprise paying out the contributions associated with the at least one game from each computing device of the plurality of computing devices, from the corresponding section of the unified pool.

11. The system as set forth in claim 9, wherein the operations further comprise processing a progressive pool trigger event associated with the at least one game from each computing device of the plurality of computing devices.

12. The system as set forth in claim 11, wherein the operations further comprise executing a partial-pay algorithm resulting in the contributions associated with the progressive pool trigger event being extracted for payment.

13. The system as set forth in claim 9, wherein the operations further comprise removing the at least one game from each gaming device of the plurality of gaming devices from the unified pool.

14. The system as set forth in claim 13, wherein removing the at least one game from each computing device of the plurality of computing devices, from the unified pool results in assigning contributions associated with the removed at least one game to an unassigned section of the unified pool.

15. The system as set forth in claim 14, wherein the operations further comprise adding a new game having a progressive pool to the unified pool, wherein adding the new game includes assigning a section of the unified pool to the progressive pool associated with the new game.

16. The system as set forth in claim 15, wherein the operations further comprise assigning the contributions assigned to the unassigned section of the unified pool to the section associated with the progressive pool associated with the new game.

17. A method to control combined contributions from a plurality of gaming devices, wherein each gaming device of the plurality of gaming devices comprises:

(i) at least one display device comprising a touch interface display displaying a virtual button deck to provide sensory feedback to a player, (ii) a plurality of input devices including:

(a) an acceptor of a wager associated with a first monetary value, wherein a contribution is extracted from each wager made by a player at a gaming machine, (b) a payout apparatus associated with a winning amount, (iii) at least one gaming device processor, (iv) at least one gaming device memory device storing a gaming component, wherein the at least one gaming device memory device is in communication with the at least one gaming device processor, and the at least one gaming device memory device has instructions stored thereon that, in response to execution by the at least one gaming device processor, cause the at least one gaming device processor to perform operations;

the method comprising:

adding, using the at least one gaming device processor of each gaming device of the plurality of gaming devices, at least one game having a progressive pool to a unified pool stored in a server, wherein adding the at least one game includes assigning a section of the unified pool dedicated to the gaming device to the progressive pool of the at least one game, wherein the unified pool is divided into plurality of individual sections, each section dedicated to the progressive pool from each gaming device of the plurality of gaming devices; and distributing, using the server, contributions associated with the at least one game from each gaming device to the section of the unified pool dedicated to the gaming device, wherein the unified pool includes contributions associated with the at least one game from each gaming device of the plurality of gaming devices, and therefore enabling the unified pool to:

include contributions for a plurality of different progressive pools from the plurality of gaming devices in the plurality of individual sections of the unified pool, and maintain separation between the contributions of the plurality of different progressive pools, and pay-out accumulated contributions, from a corresponding section, to a player at a winning gaming device that triggered a win.

18. The method as set forth in claim 17, further comprising paying out the contributions associated with the at least one game each gaming device of the plurality of gaming devices, from the corresponding section of the unified pool.

19. The method as set forth in claim 17, further comprising processing a progressive pool trigger event associated with the at least one game from each gaming device of the plurality of gaming devices.

20. The method as set forth in claim 19, further comprising executing a partial-pay algorithm resulting in the contributions associated with the progressive pool trigger event being extracted for payment.

21. The method as set forth in claim 17, further comprising removing the at least one game from each gaming device of the plurality of gaming devices from the unified pool.

22. The method as set forth in claim 21, wherein removing the at least one game from each gaming device of the plurality of gaming devices, from the unified pool results in assigning contributions associated with the removed at least one game to an unassigned section of the unified pool.

23. The method as set forth in claim 22, further comprising adding a new game having a progressive pool to the unified pool, wherein adding the new game includes assigning a section of the unified pool to the progressive pool associated with the new game.

24. The method as set forth in claim 23, further comprising assigning the contributions assigned to the unassigned section of the unified pool to the section associated with the progressive pool associated with the new game.

25. A system to control combined contributions from a plurality of gaming devices, the system comprising:

a first gaming device of the plurality of gaming devices configured to present a first game having a progressive pool;

a second gaming device of the plurality of gaming devices configured to present a second game having a progressive pool, wherein, each gaming device of the plurality of gaming devices comprising:

(i) at least one display device comprising a touch interface display displaying a virtual button deck to provide sensory feedback to a player, (ii) a plurality of input devices including:

(a) an acceptor of a wager associated with a first monetary value, wherein a contribution is extracted from each wager made by a player at a gaming machine, (b) a payout apparatus associated with a winning amount, (iii) at least one gaming device processor, (iv) at least one gaming device memory device storing a gaming component, wherein the at least one gaming device memory device is in communication with the at least one gaming device processor;

a server storing a unified pool, wherein the unified pool is divided into a plurality of individual sections, each section dedicated to a progressive pool from each gaming device of the plurality of gaming devices;

the server in communication with the first gaming device and the second gaming device of the plurality of gaming devices, wherein the server associates a dedicated first section of a plurality of individual sections of a unified pool with the progressive pool of the first game, and wherein the server associates a dedicated second section of a plurality of individual sections of the unified pool with the progressive pool of the second game, wherein the server distributes contributions associated with the first game to the first section of the unified pool, and distributing contributions associated with the second game to the second section of the unified pool, wherein the unified pool includes contributions associated with the first game and the second game, therefore enabling the unified pool to include contributions for two different progressive pools, maintain separation between the contributions of the two different progressive pools, and pay-out accumulated contributions to a player at a winning gaming device that triggered a win from a corresponding section.

26. The system as set forth in claim 25, wherein the server receives contributions corresponding to the progressive pool associated with the first game and the progressive pool associated with the second game.

27. The system as set forth in claim 26, wherein the server assigns contributions associated with the first or second game to the section associated therewith.

28. The system as set forth in claim 27, wherein the unified pool includes contributions associated with the first game and the second game such that the unified pool includes contributions for two different progressive pools.

29. The system as set forth in claim 25, wherein the server distributes funds corresponding to one of the sections based on a progressive pool trigger event resulting in a full pay-out of one of the progressive pools and a partial pay-out from the unified pool.

* * * * *